(12) United States Patent
Park et al.

(10) Patent No.: US 9,163,314 B2
(45) Date of Patent: Oct. 20, 2015

(54) CMP SLURRY COMPOSITION FOR TUNGSTEN

(75) Inventors: Jea-Gun Park, Seongnam-si (KR);
Jin-Hyung Park, Ulsan (KR);
Jae-Hyung Lim, Seoul (KR);
Jong-Young Cho, Seoul (KR); Ho Choi,
Seoul (KR); Hee-Sub Hwang, Seoul (KR)

(73) Assignee: INDUSTRIAL BANK OF KOREA, Seoul (KR)

( * ) Notice: Subject to any disclaimer, the term of this patent is extended or adjusted under 35 U.S.C. 154(b) by 0 days.

(21) Appl. No.: 13/643,375

(22) PCT Filed: Jul. 6, 2012

(86) PCT No.: PCT/KR2012/005397
§ 371 (c)(1),
(2), (4) Date: Oct. 25, 2012

(87) PCT Pub. No.: WO2013/024971
PCT Pub. Date: Feb. 21, 2013

(65) Prior Publication Data
US 2013/0214199 A1    Aug. 22, 2013

(30) Foreign Application Priority Data

Aug. 16, 2011 (KR) .................. 10-2011-0081207
Nov. 11, 2011 (KR) .................. 10-2011-0117872

(51) Int. Cl.
*C09K 3/14* (2006.01)
*C09G 1/02* (2006.01)
*C23F 1/30* (2006.01)
*C23F 3/06* (2006.01)

(52) U.S. Cl.
CPC ... *C23F 1/30* (2013.01); *C09G 1/02* (2013.01); *C23F 3/06* (2013.01)

(58) Field of Classification Search
CPC .......... C09G 1/02; C09K 3/14; C09K 3/1454; C23F 1/30
USPC ............... 51/307; 252/79.1; 438/690, 693
See application file for complete search history.

(56) References Cited

U.S. PATENT DOCUMENTS

2004/0132305 A1* 7/2004 Nishimoto et al. ........... 438/690
2010/0075501 A1* 3/2010 Abe et al. ..................... 438/693

FOREIGN PATENT DOCUMENTS

| CN | 1242729 A | 1/2000 |
| JP | 6313164 | 11/1994 |
| JP | 10-265766 A | 10/1998 |
| JP | 2004153158 A | 5/2004 |
| JP | 2009206148 A | 9/2009 |

(Continued)

OTHER PUBLICATIONS

International Search Report dated Feb. 18, 2013.

(Continued)

*Primary Examiner* — Pegah Parvini
(74) *Attorney, Agent, or Firm* — Lucas & Mercanti, LLP

(57) ABSTRACT

The present invention relates to a CMP slurry composition for polishing tungsten comprising a abrasive and a polishing chemical, wherein the abrasive comprises colloidal silica dispersed in ultra-pure water, and the polishing chemical comprises hydrogen peroxide, ammonium persulfate and iron nitrate. The slurry composition is not discolored and has good etching selectivity, so as to be applied to a CMP process.

2 Claims, 13 Drawing Sheets

(56) References Cited

FOREIGN PATENT DOCUMENTS

| | | |
|---|---|---|
| JP | 2010073953 A | 4/2010 |
| KR | 10-2004-0086290 A | 10/2004 |
| KR | 10-2005-0071139 A | 7/2005 |
| KR | 10-2008-0003260 A | 1/2008 |
| KR | 10-2008-0028790 A | 4/2008 |
| KR | 10-2011-0063400 A | 6/2011 |
| TW | I236398 B | 7/2005 |
| TW | 2009-03615 A | 1/2009 |

OTHER PUBLICATIONS

Written Opinion in Korean and English translation dated Feb. 19, 2013.

* cited by examiner

CMP SLURRY COMPOSITION FOR TUNGSTEN

CROSS REFERENCE TO RELATED APPLICATIONS

This patent is a U.S. national phase under 35 U.S.C. 371 of PCT/KR2012/005397 filed on Jul. 6, 2012, which claims benefit of priority from Korean Patent Application Nos. 10-2011-0081207 and 10-2011-00117872, filed on Aug. 16, 2011 and Nov. 11, 2011, the contents of which are incorporated herein by reference in its entirety.

FIELD OF THE INVENTION

The present invention relates to a slurry composition used in a CMP (Chemical Mechanical Polishing) process of a semiconductor manufacturing process, particularly to a CMP slurry composition, which can be used for planarization of a tungsten metal film.

BACKGROUND OF THE INVENTION

Recently, in a multilayer polishing process, a dual damascene process and the like of an integrated circuit, a CMP (Chemical Mechanical Polishing) process is mainly used for global planarization on the wafer surface. The CMP process is a polishing method for planarizing the wafer surface chemical-mechanically using a polishing pad and slurry when manufacturing a semiconductor, and in this process, the slurry composition is dropped on the polishing pad made of polyurethane and then contacted with the wafer followed by subjecting the wafer to orbital movement combining rotation and translation.

In the CMP process, the slurry generally comprising polishing agents (abrasives) for physical polishing effect and active ingredients (for example, etchants or oxidants) for chemical polishing effect allows any protrusion of the wafer surface to be selectively etched physicochemically, resulting in planarization of the wafer.

According to the polishing subject, the CMP slurry can be classified into insulating layer polishing slurry and metal polishing slurry. The insulating layer polishing slurry can be applied to a ILD (interlayer dielectric) process or a STI (Shallow trench isolation) process in a semiconductor process, and the metal polishing slurry can be applied to form interconnects of tungsten, aluminum or copper wires and tungsten contacts/via plug, or to a dual damascene process.

FIG. 1 shows a flow chart of a process manufacturing a semiconductor device to which the tungsten CMP slurry composition according to the present invention is applied.

in the process for manufacturing a flash memory device according to one embodiment of the present invention, first of all, as shown in FIG. 1, a $SiO_2$ oxide film is formed on a semiconductor substrate, a silicon substrate equipped with some structures such as, a gate electrode, a source plug contact region and a drain plug contact region to the thickness of 1000 to 2000 Å, and then the $SiO_2$ oxide film is etched to expose the source plug contact region so as to form a contact hole.

Then, as shown in FIG. 1, a tungsten (W) film is deposited on the entire surface to completely fill up the contact hole. In order to enhance adhesiveness of the tungsten film with the $SiO_2$ oxide film and a nitride film, an adhesive layer made of Ti is formed on the surface of the semiconductor substrate before depositing the tungsten film, and a barrier metal film made of TiN is further formed on the adhesive layer to prevent bonding between $WF_6$ (source material) and highly reactive Ti when forming the tungsten film. Subsequently, as the first CMP process using the metal slurry, the tungsten film on the $SiO_2$ oxide film is polished to form a tungsten plug in the contact hole. After completing the first CMP process, oxidative defects caused by chemical reaction between hydrogen peroxide ($H_2O_2$) solution and the metal slurry are severely occurred on the tungsten plug of the semiconductor substrate.

Then, in order to remove the oxidative defects, the second soft CMP process is conducted by using oxide slurry for several seconds to several minutes resulting in removing the oxidative defects on the tungsten plug and polishing the $SiO_2$ oxide film to a certain thickness.

In the said process for manufacturing a semiconductor device, the slurry for the first metal polishing slurry generally comprises abrasives, oxidants, auxiliary oxidants, dispersing agents, pH controlling agents, other additives and the like. Among the said ingredients, the abrasives are for mechanical polishing, the oxidants and the auxiliary oxidants are for promoting polishing through oxidation of the metal layer, the dispersing agents are for enhancing dispersion stability of the slurry, the pH controlling agents are for controlling pH range in which oxidation could occur well according to properties of the metal layer as a polishing subject, and other additives are for improving or complementing performance of the slurry.

The tungsten CMP process uses slurry containing the oxidants, and generally, strong oxidants such as hydrogen peroxide ($H_2O_2$) and iron nitrate ($Fe(NO_3)_3$) are mixed with the slurry containing abrasives such as silica and alumina minute particles. The oxidants in the slurry oxidize the tungsten surface to tungsten oxide ($WO_3$), which can be easily removed with the abrasives because it is weaker than W. In the tungsten CMP process, processes removing $WO_3$ with the abrasives in the slurry and the CMP pad for mechanical polishing, oxidizing the metal W under the $WO_3$ layer to $WO_3$ by the oxidants, and removing thereof are repeated to remove the tungsten film. And the metal barrier film can be removed by similar mechanism with the tungsten polishing.

In the metal CMP process, a process removing the oxides formed by the oxidants with the abrasive particles is conducted repeatedly. Therefore, in order to enhance polishing rate, the oxidation process should be conducted faster, or the slurry should be designed in consideration of smoothly removing the formed oxides.

With ease, there is a method to enhance the polishing rate by increasing the concentration of the oxidants corroding metals, but it may decrease reliability and yield of a device because erosion even occurs at a part, where a wiring layer should be formed for electrical properties of the device, such as corrosion pit or contact parts according to the increase of erosion rate.

The metal polishing slurry should have difference in the polishing rates in the metal layer and the insulating layer. Therefore, higher polishing rate is needed in a metal wire, and lower polishing rate is needed in the insulating layer. If the rate difference is low, defects such as erosion may occur at parts where pattern density is high because the polishing rate is partially increased only at parts where the pattern density is high. Therefore, the polishing rate in the insulating layer should become lower to prevent partial increase of the polishing rate.

Now, CMP slurry containing iron nitrate is widely used. For example, Korean Patent No. 10-0745447 by Cabot discloses a chemical and mechanical polishing precursor composition comprising: catalysts having multiple oxidation states, which are mixed with oxidants and useful for removing a metal layer from a substrate; and stabilizers, and the used catalysts contains iron.

However, the conventional slurry containing strong oxidants act directly on the tungsten surface resulting in causing strong oxidation. Therefore, because its tungsten film removing rate to its interlayer insulating film removing rate, i.e., polishing selectivity, is very high as 50 to 150, there are problems that excessive plug recess may occur, and roughness of the plug surface after completing CMP may become high. Further, when a metal catalyst comprising iron nitrate is used, there is a problem of occurring pad contamination caused by discoloration. Accordingly, development of CMP slurry, which can improve the problems, is needed.

SUMMARY OF THE INVENTION

It is an object of the present invention to provide a CMP slurry composition for polishing tungsten, which does not have problems such as pad contamination caused by discoloration and the like, and has good etching selectivity between metal films when it is used in a tungsten CMP process.

In order to accomplish one object of the present invention, the present invention provides a CMP slurry composition for polishing tungsten comprising an abrasive and a polishing chemical, wherein the abrasive comprises colloidal silica dispersed in ultra-pure water; and the polishing chemical comprises hydrogen peroxide, ammonium persulfate and iron nitrate.

According to one embodiment of the present invention, the amount of the colloidal silica is preferably 2~4 weight %.

Further, according to another embodiment of the present invention, the amount of the iron nitrate is preferably 0.01~0.1 weight %.

Further, according to another embodiment of the present invention, a CMP slurry composition for polishing tungsten, wherein etching selectivity of tungsten and titanium nitride is 1:1.5~2, and etching selectivity of tungsten and an oxide film is 2:1 or more, is provided.

Further, according to another embodiment of the present invention, pH of the composition is preferably 2~4.

ADVANTAGEOUS EFFECTS OF THE INVENTION

The CMP slurry composition for polishing tungsten according to the present invention comprises iron nitrate, hydrogen peroxide and ammonium persulfate to the proper composition ratio. Accordingly, the discoloration problem, which occurs when using a conventional slurry composition excessively comprising iron nitrate to a CMP process, can be solved, and the CMP slurry composition of the present invention can be effectively used to a tungsten CMP process due to its good etching selectivity between titanium nitride and an oxide film.

BRIEF DESCRIPTION OF DRAWINGS

The above and other objects and features of the present invention will become apparent from the following description of the invention taken in conjunction with the following accompanying drawings, which respectively show.

DETAILED DESCRIPTION OF THE INVENTION

Figure 1:
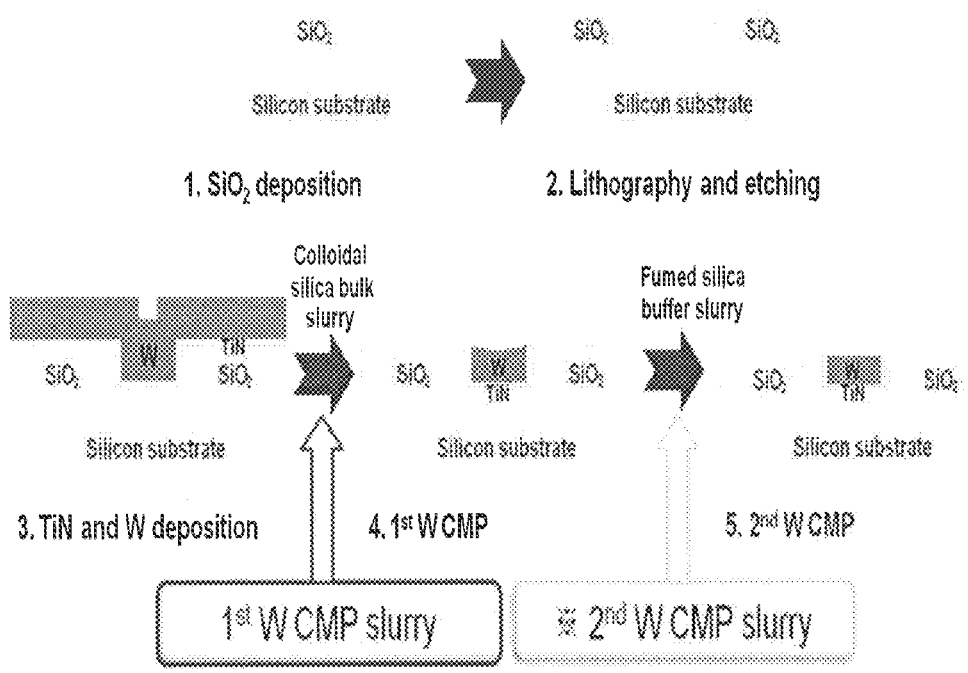
FIG. 1: a schematic diagram of a general tungsten CMP process to which the slurry composition according to the present invention is applied.

Hereinafter, the present invention will be described in detail with reference to the following Examples without limiting its scope.

The CMP slurry composition for polishing tungsten according to the present invention comprises a abrasive and a polishing chemical, wherein the abrasive comprises colloidal silica dispersed in ultra-pure water; and the polishing chemical comprises hydrogen peroxide, ammonium persulfate and iron nitrate.

According to one embodiment of the present invention, the amount of the colloidal silica is preferably 2~4 weight %. When the amount of the colloidal silica is less than 2 weight %, polishing rate may become low, and when it is more than 4 weight %, a scratch may be highly formed.

Further, according to another embodiment of the present invention, the amount of the hydrogen peroxide is preferably 0.5~2 weight %. When the amount of the hydrogen peroxide is less than 0.5 weight %, polishing rate may be reduced because tungsten is not oxidized, and when it is more than 2 weight %, the concentration of the hydrogen peroxide of more than 2 weight % may mean nothing due to saturation of tungsten oxide.

Further, according to another embodiment of the present invention, the amount of the ammonium persulfate is preferably 0.05~1 weight %. When the amount of the ammonium persulfate is less than 0.05 weight %, it is not good to be applied to the CMP process because selectivities of TiN and W are similar.

Further, according to another embodiment of the present invention, the amount of the iron nitrate is preferably 0.01~0.1 weight %. When the amount of the iron nitrate is more than 0.1 weight %, slurry may be discolored. Accordingly, when it is used to the CMP process, there may be a problems such as pad contamination. And when the amount of the iron nitrate is less than 0.01 weight %, it is difficult to be used due to low tungsten polishing rate.

Further, according to another embodiment of the present invention, a CMP slurry composition for polishing tungsten, wherein etching selectivity of tungsten and titanium nitride is 1:1.5~2, and etching selectivity of tungsten and an oxide film is 2:1 or more, is provided.

Because the slurry composition according to the present invention is applied to the tungsten where the nitride film is formed, when etching selectivity of tungsten and titanium nitride is less than 1:1.5 or more than 1:2, and when etching selectivity of tungsten and oxide film is less than 2:1, there may be defects on a tungsten plug.

Further, according to another embodiment of the present invention, pH of the composition is preferably 2~4. When the pH is less than 2, it is difficult and dangerous to treat due to strong acidity, and when the pH is more than 4, corrosion pit may be formed on the surface by polishing due to corrosion not by polishing due to tungsten oxide formation.

The following preferable Examples are intended to further illustrate the present invention by way of help understanding the present invention, and thus are not limitative of the present invention.

A tungsten wafer prepared by depositing an oxide film and titanium so nitride on a silicon wafer, respectively, followed by depositing 6000 Å tungsten thereon; a titanium nitride wafer prepared by depositing an oxide film 1000 Å on a silicon wafer followed by depositing titanium nitride 3000 Å thereon; and a silicon oxide film wafer prepared by depositing PETEOS 7000 Å as an insulating film were used. As a polishing device, poli-300 of G&P Tech. was used, and as a polishing pad, IC 1000/Suba IV CMP pad of Rohm & Haas was used. Tungsten, titanium nitride and silicon films were polished for 60, 30 and 60 s, respectively, under a condition of: downforce pressure of 2.5 psi, table and spindle speeds of 90 rpm, respectively, and slurry flow rate of 100 mL/min.

As abrasive, colloidal silica (Fuso, PL-7) having the primary particle size of 75 nm and the secondary particle size of 215 nm was used to the amount of 4 weight %, and it was uniformly dispersed in ultra-pure water.

As an oxidant, a hydrogen peroxide (JunSei) was used to the amount of 1 weight %; as a oxidation promoter, iron nitrate(III) (Sigma-Aldrich) was used; and ammonium persulfate (Sigma-Aldrich) was used to improve etching selectivity. The slurry pH was 2 to 3.

COMPARATIVE EXAMPLE 1

CMP Slurry Composition Comprising Hydrogen Peroxide Only

Figure 2:
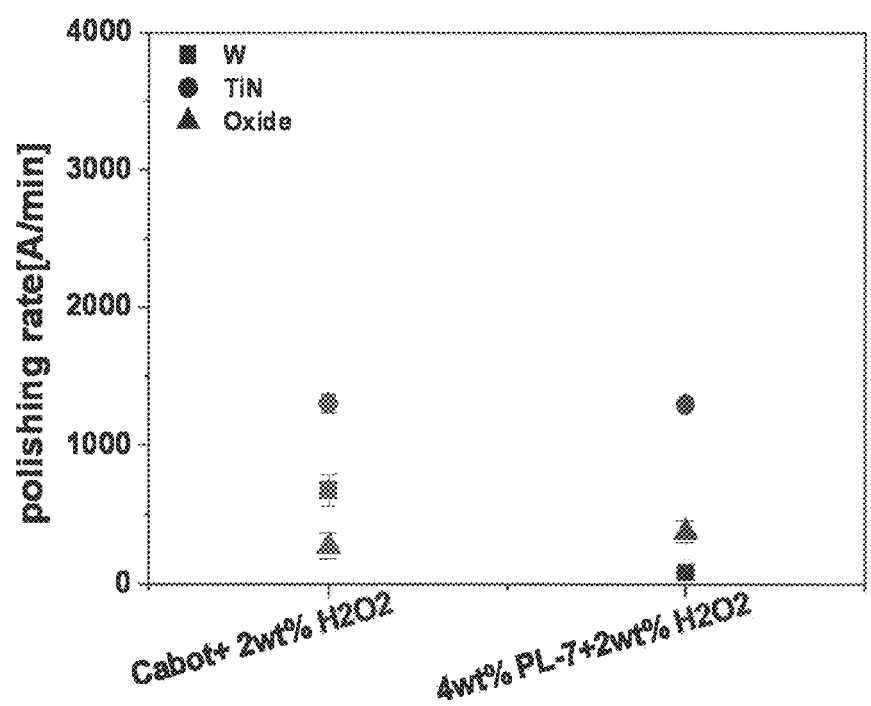
FIG. 2: a graph showing polishing rate of the CMP slurry composition according to Comparative Example 1 to W, TiN and Oxide.

According to the following Table 1, Comparative Example 1 is the case of the slurry prepared by adding only $H_2O_2$, which is generally used in the CMP process, to the amount of 2 weight %, and polishing rates of the slurry composition of Comparative Example 1 to W, TiN and oxide were shown in FIG. 2.

As shown in FIG. 2, the slurry composition of Comparative Example 1, wherein only $H_2O_2$ generally used in the CMP process was added thereto to the amount of 2 weight % showed very low polishing rate to tungsten. Therefore, it was confirmed that other additives are needed.

TABLE 1

| abrasive type | Polishing chemical Oxidant(1) |
|---|---|
| Colloidal silica (PL-7) 4 weight % | $H_2O_2$ 2 weight % |

COMPARATIVE EXAMPLE 2

CMP Slurry Composition Comprising Ammonium Persulfate and Hydrogen Peroxide

According to the following Table 2, Comparative Example 2 is the case of further adding ammonium persulfate (APS: ammonium persulfate) used in a metal CMP process to the amount of 2 weight %, and the polishing rates to W, TiN, Oxide were measured. The results were shown in FIG. 3.

Figure 3:
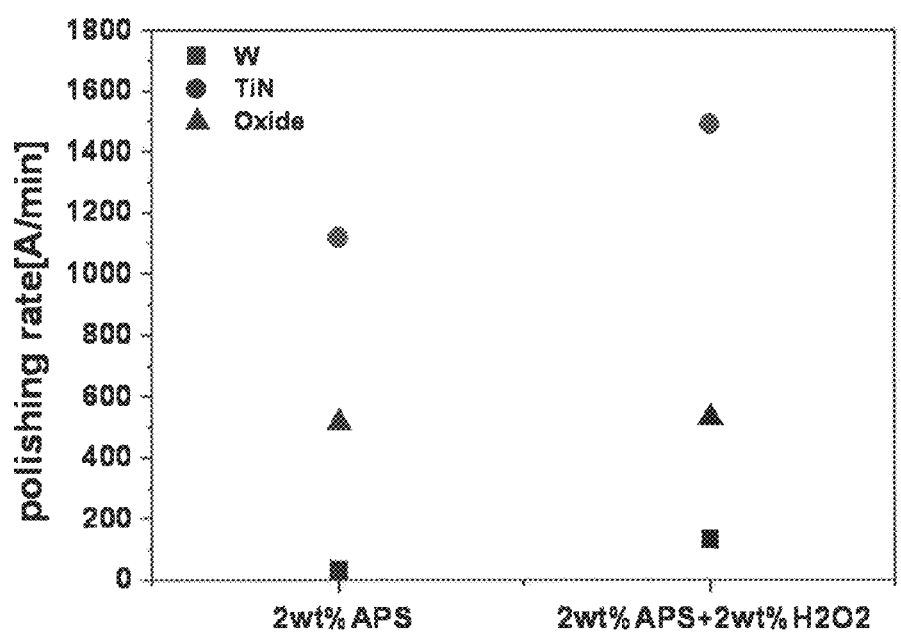
FIG. 3: a graph showing polishing rate of the CMP slurry composition according to Comparative Example 2 to W, TiN and Oxide.

As shown in Table. 2, Comparative Example 2 mixing APS and $H_2O_2$ showed low tungsten polishing rate as shown in FIG. 3, but TiN polishing rate was improved. Accordingly, it was confirmed that other additives are required to increase the tungsten polishing rate.

TABLE 2

| | Polishing chemical | |
|---|---|---|
| Abrasive type | Oxidant(1) | Oxidant(2) |
| Colloidal silica (PL-7) 4 weight % | APS 2 weight % | $H_2O_2$ 2 weight % |

COMPARATIVE EXAMPLE 3

CMP Slurry Composition Comprising Iron Nitrate

Figure 4A:
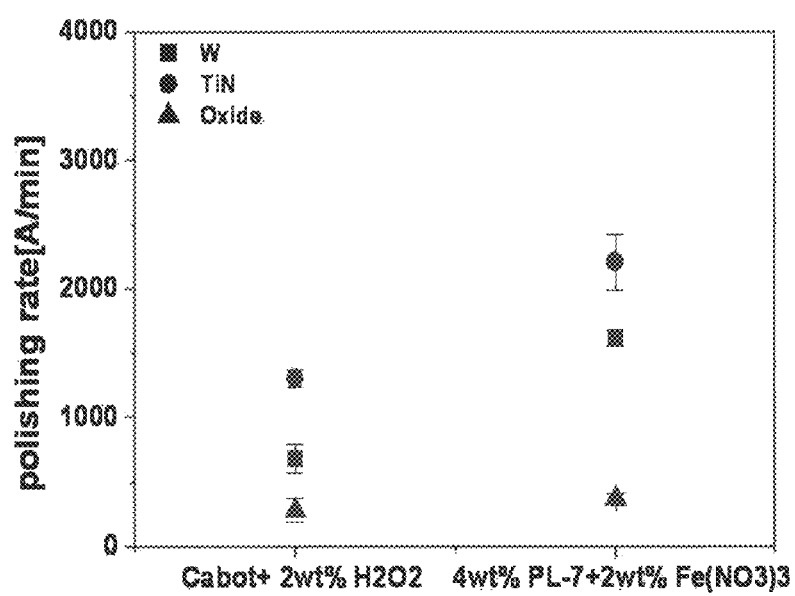
FIG. 4: a graph showing polishing rate of the CMP slurry composition according to Comparative Example 3 to W, TiN and Oxide(4a) and an image showing slurry discoloration (4b)
Figure 4B:
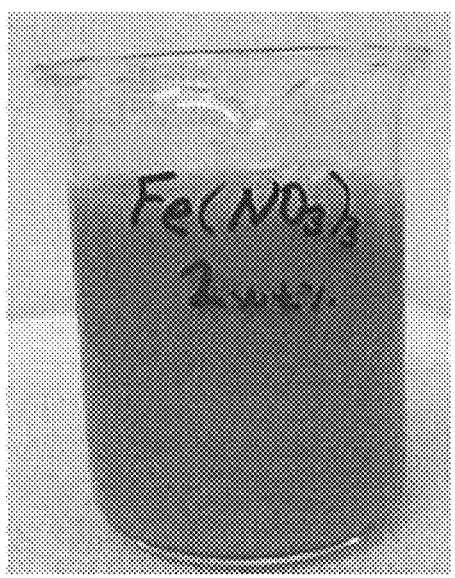

According to the following Table 3, Comparative Example 3 is the case of adding $Fe(NO_3)_3$ to the slurry composition to the amount of 2 weight %, and the polishing rates to W, TiN, Oxide were measured. As shown in FIG. 4, the tungsten polishing rates were high as 1600 Å/min, but there were problems of pad contamination caused by slurry discoloration, life, metal contamination and the like.

TABLE 3

| Abrasive type | Polishing chemical Oxidant(1) |
|---|---|
| Colloidal silica (PL-7) 4 weight % | $Fe(NO_3)_3$ 2 weight % |

Figure 5:
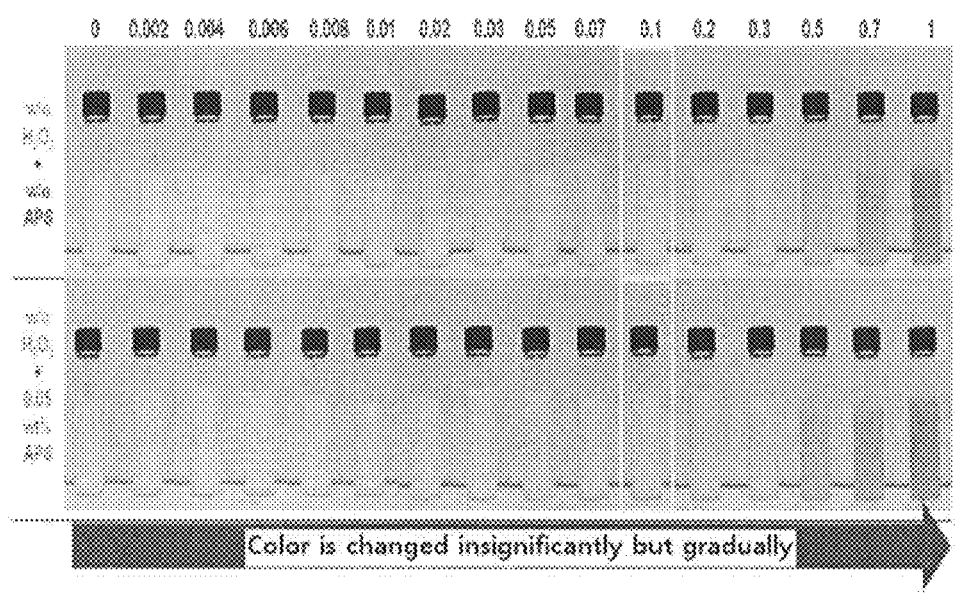
FIG. 5: an image showing the result of discoloration according to iron nitrate concentration increase.

Accordingly, the point of slurry discoloration was searched while changing the $Fe(NO_3)_3$ concentration to be added, and as a result, when $Fe(NO_3)_3$ was added to the amount of more than 0.1 weight %, color was started to change little by little as shown in FIG. 5.

Therefore, it was confirmed that iron nitrate may be used to the amount of less than 0.1 weight %, preferably.

COMPARATIVE EXAMPLE 4

CMP Slurry Composition Comprising Iron Nitrate and Ammonium Persulfate

Figure 6:
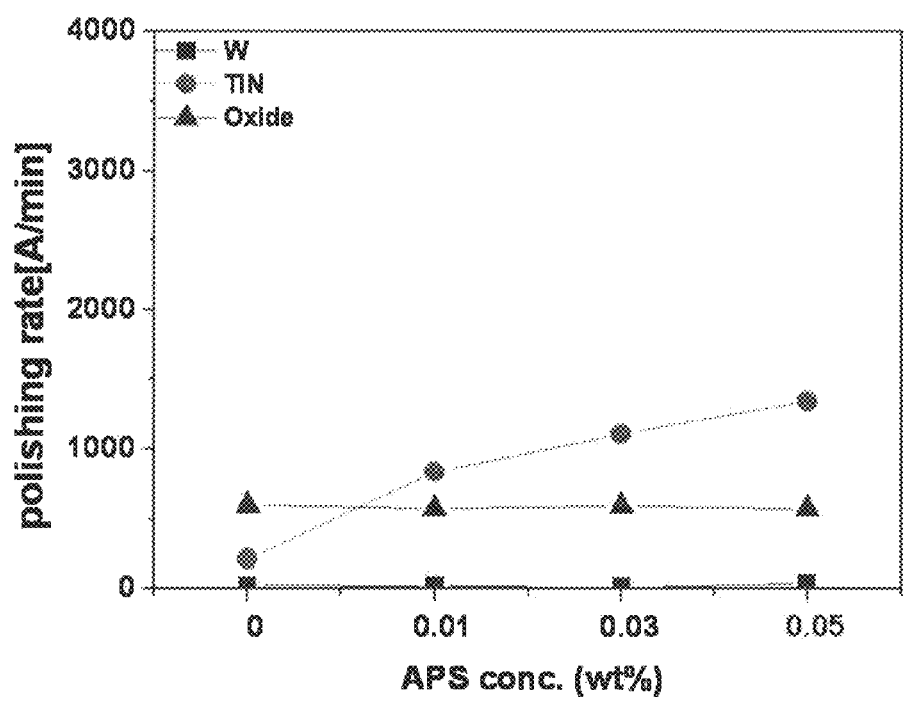
FIG. 6: a graph showing polishing rate of the CMP slurry composition according to Comparative Example 4 to W, TiN and Oxide.

According to the following Table 4, Comparative Example 4 is the case of adding $Fe(N_3)_3$ 0.01 weight % and changing the concentrations of APS without $H_2O_2$, and the polishing rates to W, TiN, Oxide were measured. As shown in FIG. 6, the polishing rates of tungsten were very low.

TABLE 4

| | Polishing chemical | |
|---|---|---|
| Abrasive type | Oxidant(1) | Oxidant(2) |
| Colloidal silica (PL-7) 4 weight % | Fe(NO$_3$)$_3$ 0.01 weight % | APS 0~0.05 weight % |

COMPARATIVE EXAMPLE 5

CMP Slurry Composition Comprising Hydrogen Peroxide and Iron Nitrate

Figure 7A:
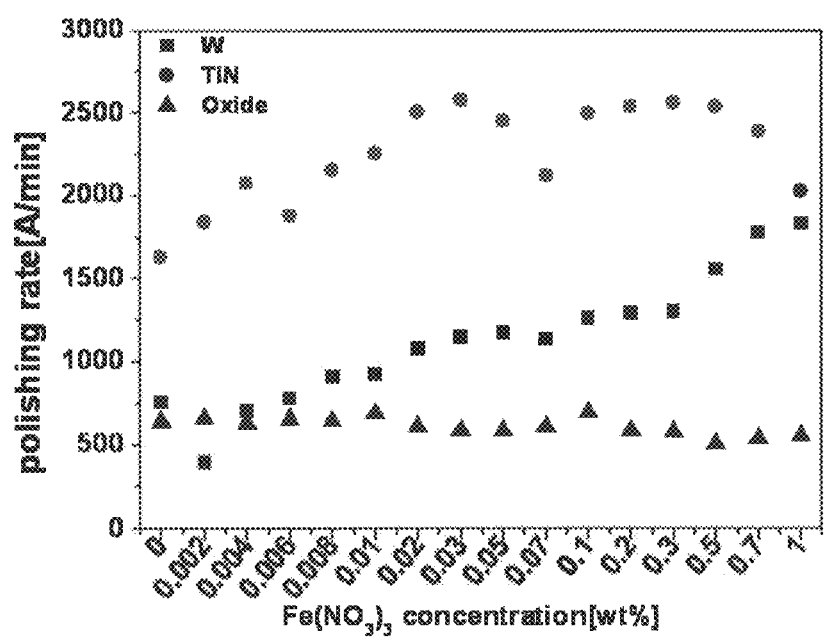
FIG. 7: a graph showing polishing rate of the CMP slurry composition according to Comparative Example 5 to W, TiN and Oxide.
Figure 7B:
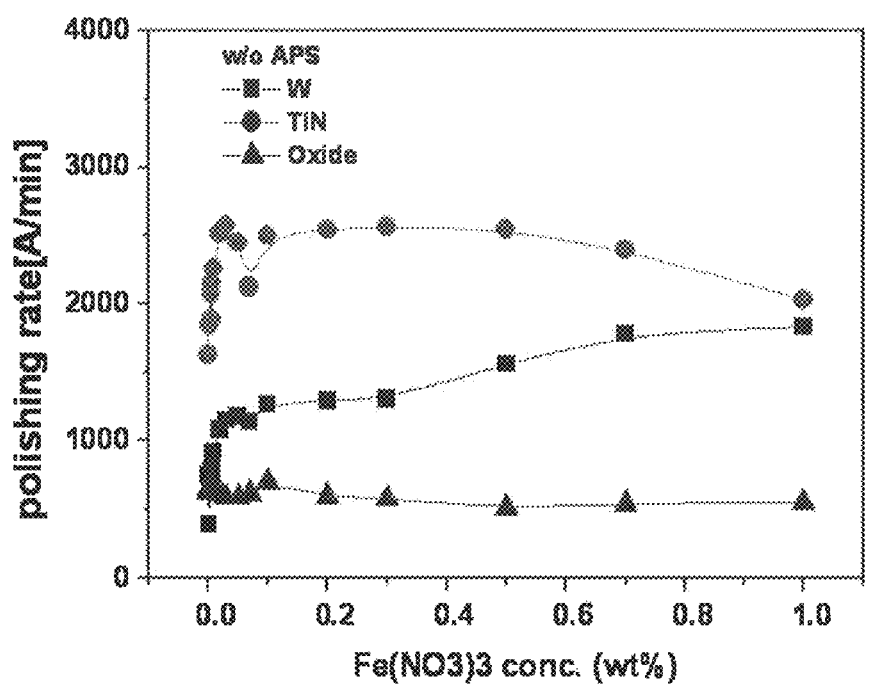

According to the following Table 5, Comparative Example 5 is the case of adding H$_2$O$_2$ weight % and changing the concentrations of Fe(NO$_3$)$_3$, and the polishing rates to W, TiN, and Oxide were measured. The results were shown in FIG. 7.

TABLE 5

| | Polishing chemical | |
|---|---|---|
| Abrasive type | Oxidant(1) | Oxidant(2) |
| Colloidal silica (PL-7) 4 weight % | H$_2$O$_2$ 1 weight % | Fe(NO$_3$)$_3$ 0.01~1 weight % |

In case of tungsten, according to the increase of Fe(NO$_3$)$_3$ concentration from 0 to 0.03 weight %, the polishing rate was sharply increased from 750 to 1150 Å/min, and according to the increase of the concentration from 0.03 to 1 weight %, the polishing rate was increased from 1150 to 1830 Å/min step by step.

In case of TiN, according to the increase of Fe(NO$_3$)$_3$ concentration from 0 to 0.03 weight %, the polishing rate was sharply increased from 1630 to 2580 Å/min, and according to the increase of the concentration more than 0.03 weight %, the polishing rate was gradually decreased from 2580 to 2030 Å/min at the Fe(NO$_3$)$_3$ concentration of 1 weight %.

In case of Oxide, the polishing rate was 500 to 600 Å/min according to the Fe(NO$_3$)$_3$ concentration without the big changes in etching rate.

EXAMPLE 1

CMP Slurry Composition Comprising Hydrogen Peroxide, Iron Nitrate and Ammonium Persulfate As the results of the previous experiments, it was confirmed that the etching selectivity of TiN—W during the tungsten CMP should be 1.5 to 2 or more, and the etching selectivity of W-Oxide should be 2 or more.

Further, it was concluded that the present slurry using the colloidal silica, H$_2$O$_2$ and Fe(NO$_3$)$_3$ in an acidic region can't solve the slurry discoloration problem and etching selectivity problems of TiN—W, W-Oxide. As the results of the experiments, it was confirmed that the slurry discoloration does not occur at the Fe(NO$_3$)$_3$ concentration of 0.03 weight % or less due to rapid increase of the polishing rates of both W and TiN, but it is difficult to use.

Accordingly, depending on the demand of developing new additives and slurry, which can reduce the polishing rate of titanium nitrate and are not discolored, the following slurry composition having the composition listed in Table 6 was prepared.

TABLE 6

| | Polishing chemical | | |
|---|---|---|---|
| Abrasive type | Oxidant(1) | Oxidant(2) | Oxidant(3) |
| Colloidal silica (PL-7) 4 weight % | H$_2$O$_2$ 1 weight % | Fe(NO$_3$)$_3$ 0.05 weight % | APS 0~5 weight % |

In the case of TiN, when the Fe(NO$_3$)$_3$ was 0.05 weight %, the polishing rate was rapidly reduced from 2350 to 1900 Å/min as increasing the APS concentration from 0 to 0.1 weight %, and the polishing rate was reduced step by step from 1900 to 1530 Å/min as increasing the APS concentration from 0.1 to 1 weight %. But the tungsten polishing rate was rapidly increased from 1060 to 1270 Å/min as increasing the APS concentration from 0 to 0.1 weight %, and the polishing rate was gradually increased from 1270 to 1300 Å/min as increasing the aps concentration from 0.1 to 1 weight %.

Figure 8:
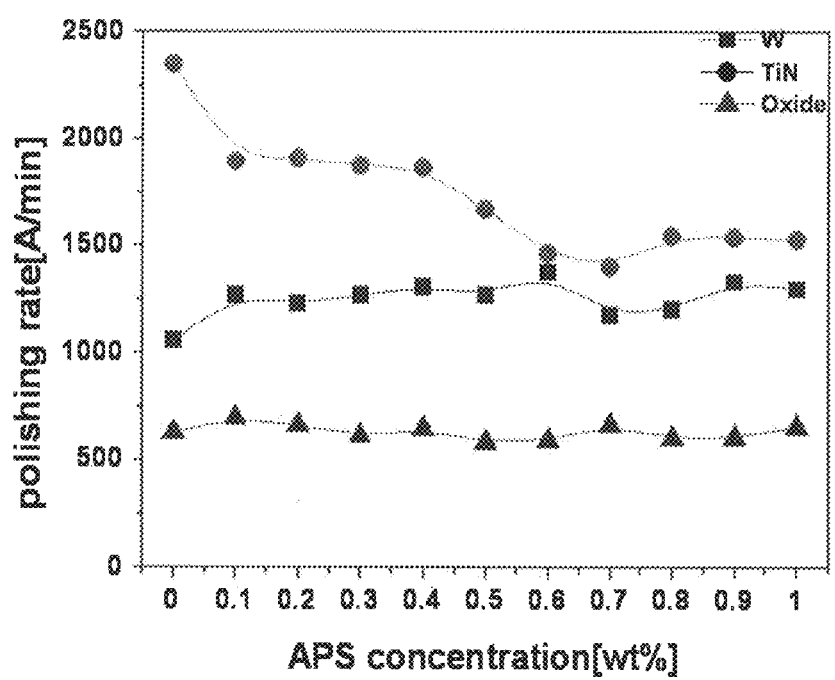
FIG. 8: a graph showing polishing rate of the CMP slurry composition according to Example to W, TiN and Oxide as changing the APS concentration.

From this result, it was confirmed that the polishing rate of TiN was suppressed and the polishing rate of tungsten was increased by adding APS, and therefore, the etching selectivities of TiN—W and W-Oxide can be properly controlled (FIG. 8).

Figure 9A:
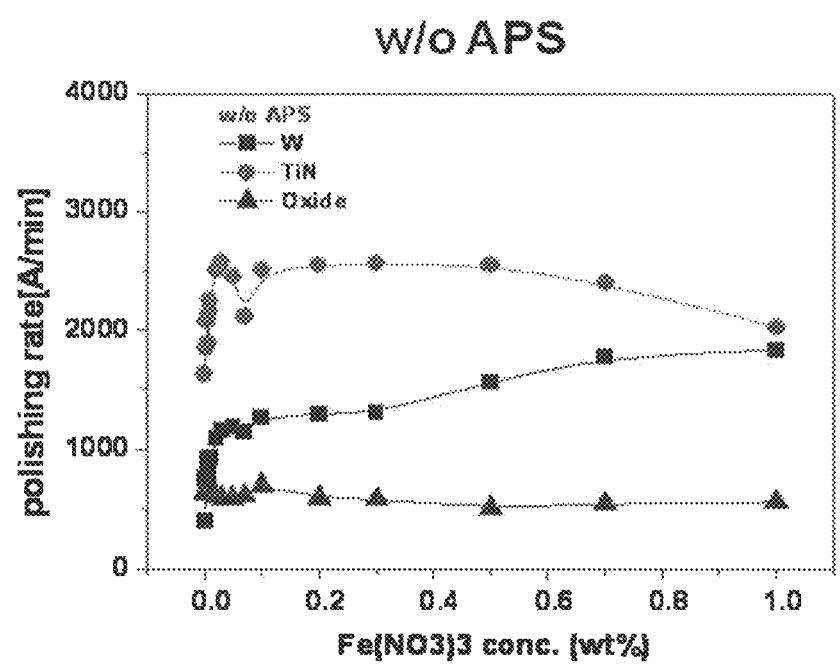
FIG. 9: a graph showing polishing rate of the CMP slurry composition according to Example as changing the iron nitrate concentration.
Figure 9B:
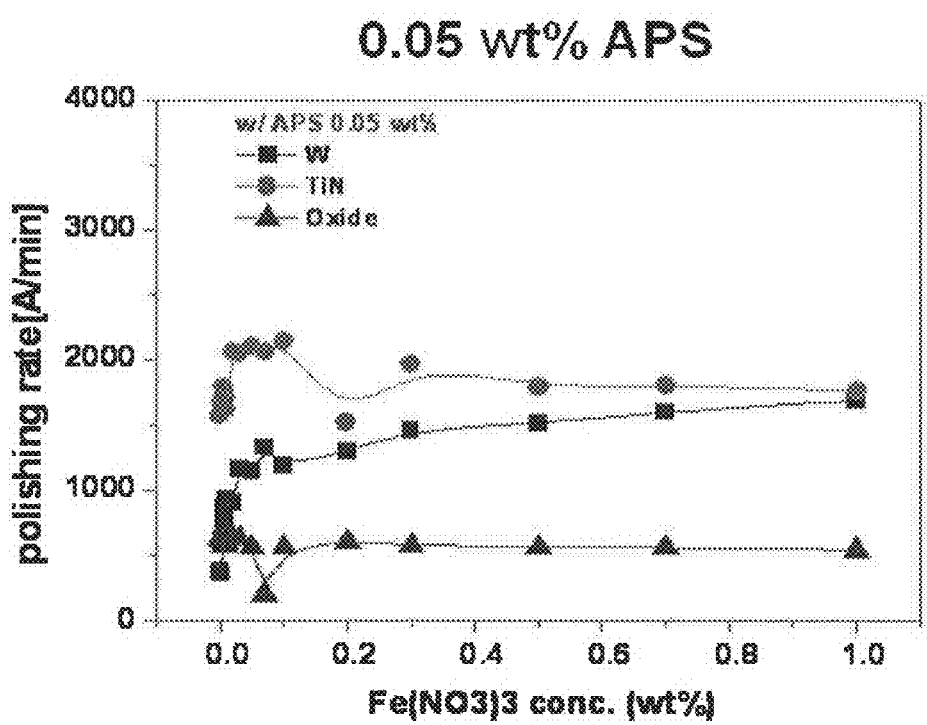
Figure 9C:
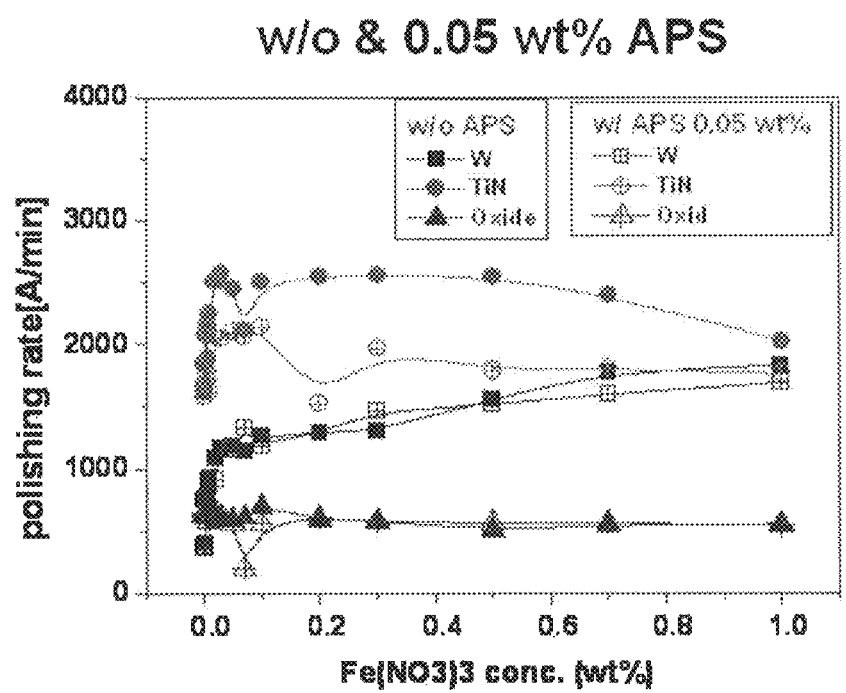

As the result of evaluating polishing of the composition wherein H$_2$O$_2$ 1 weight % was added to a colloidal silica-based slurry without APS, and the composition wherein APS 0.05 weight % together with H$_2$O$_2$ were added to the slurry according to the Fe(NO$_3$)$_3$ concentration, the polishing rate of TiN was reduced about 600 Å/min, but the polishing rates of W and Oxide almost did is not change. Consequently, the etching selectivities of TiN—W and W-Oxide at APS 0.05 weight % and Fe(NO$_3$)$_3$ 0.1 weight % were 1.8:1 and 2.1:1, respectively (FIG. 9).

What is claimed is:

1. A Chemical Mechanical Polishing (CMP) slurry composition for polishing tungsten consisting of;
   an abrasive and a polishing chemical to inhibit discoloration and to adjust etching selectivity by decreasing a polishing rate of titanium nitride and increasing a polishing rate of tungsten,
   wherein
   the abrasive consists of colloidal silica dispersed in ultra-pure water;
   the polishing chemical consists of hydrogen peroxide in an amount of 0.5-2 weight%, ammonium persulfate in an amount of 0.05-1 weight% and iron nitrate in an amount of 0.01-0.1 weight%;
   etching selectivity of tungsten and titanium nitride is 1:1.5-2 and etching selectivity of tungsten and an oxide film is 2:1 or more;
   the amount of the colloidal silica is 2-4 weight%;
   pH of the composition is 2-4; and
   the polishing rate of titanium nitride is decreased and the polishing rate of tungsten is increased as increasing the concentration of ammonium persulfate.

2. The CMP slurry composition of claim 1, wherein the etching selectivity of tungsten and titanium nitride is 1:1.8 and the etching selectivity of tungsten and an oxide film is 2.1:1 at ammonium persulfate of 0.05 weight% and iron nitrate of 0.1 weight%.

* * * * *